United States Patent [19]

Harrison

[11] Patent Number: 5,051,721
[45] Date of Patent: Sep. 24, 1991

[54] SUPPLEMENTAL TURN SIGNAL APPARATUS FOR VEHICLES

[76] Inventor: Frank Harrison, P. O. Box 1824, Kansas City, Mo. 64141

[21] Appl. No.: 405,644

[22] Filed: Sep. 11, 1989

[51] Int. Cl.⁵ .............................................. B60Q 1/38
[52] U.S. Cl. .................................... 340/475; 340/472
[58] Field of Search ................ 340/472, 474, 475, 476

[56] References Cited

U.S. PATENT DOCUMENTS

| | | |
|---|---|---|
| 1,241,904 | 10/1917 | Baumgart . |
| 1,596,216 | 8/1926 | Pangburn . |
| 2,851,674 | 9/1958 | Boone . |
| 3,564,497 | 2/1971 | Gazzo . |
| 3,593,418 | 7/1971 | Evans .................................. 340/472 |
| 3,800,430 | 4/1974 | Samra .................................. 340/472 |
| 4,431,984 | 2/1984 | Bileck .................................. 340/468 |
| 4,622,494 | 11/1986 | Johnson . |
| 4,631,516 | 12/1986 | Clinker . |
| 4,754,256 | 6/1988 | Fluhr et al. . |

Primary Examiner—Joseph A. Orsino
Assistant Examiner—Brian R. Tumm
Attorney, Agent, or Firm—Hovey, Williams, Timmons & Collins

[57] ABSTRACT

A supplemental turn signal apparatus (10) is provided for use with a vehicle (82) having a conventional electrical turn signal system (12). Apparatus (10) includes activable connection structure (14), signal displays (16), (18), audible signal devices (20), (22) and dashboard flasher devices (24), (26). The signal displays (16), (18) are activated to indicate an immediate turn in the appropriate direction. When a turn is indicated as for example, at flasher (68) by depressing the turn signal lever downwardly, the signal display (16) may optionally be activated by depressing structure (38) so that signal display (16) receives a synchronous signal from flasher (68) via supplemental switch (56). Due to the closing of maintenance switch (48) by a coil (52), signal display (16) will remain activated as long as system switch (76) is maintained in a closed position, that is, normally until the left turn is completed.

4 Claims, 1 Drawing Sheet

SUPPLEMENTAL TURN SIGNAL APPARATUS FOR VEHICLES

BACKGROUND OF THE INVENTION

1. Field of the Invention

This invention relates to apparatus which conveniently provides optional turn signals for turning a motor vehicle. More particularly, it is concerned with apparatus having additional safety signals which may be optionally, synchronously combined with conventional turn signals at the push of a button.

2. Description of the Prior Art

Turn signal lamps on motor vehicles have enhanced driving efficiency and safety for many years. Despite the safety value of these devices however, turn signals are often misinterpreted by viewing drivers. One problem is that inattentive motorists often leave turn signals on when no present intent to turn exists, thus leading to ambiguity as to when a valid signal is being made. For example, a driver might change lanes and then forget to manually return the turn signal lever to the neutral position. Another problem, particularly pervasive around major thoroughfares, is the misinterpretation of when the turn will occur. For example, a driver might turn his right turn signal on indicating his intent to turn into his driveway in the middle of a block. The following driver might misinterpret such a signal as reflecting an intent to turn at the next intersection. For obvious reasons, such a misinterpretation might have an adverse impact on the following driver's attentiveness, caution and rate of speed.

What is needed is a device which allows the signaling driver to give an unambiguous indication of his intent to turn into a driveway or other similar route. Such a device would optimally allow the signaling driver to implement the additional signal at his option so as to be able to distinguish between turns at intersections as opposed to turns into driveways or the like.

A number of devices have been invented in an attempt to deal with the hazards of turning vehicles. In general, however, these devices have not adequately met the above described needs because of an inability to make the supplemental signal optional at the discretion of the driver. Patents illustrating these prior devices include: U.S. Pat. Nos. 1,241,904, 1,596,216, 2,851,674, 3,564,497, 4,622,494, 4,631,516, and 4,754,256.

SUMMARY OF THE INVENTION

The problems outlined above are in large measure solved by the supplemental turn signal apparatus in accordance with the present invention. That is to say, the apparatus hereof provides an optional, supplemental turn signal to indicate the driver's intention to turn into a driveway.

The supplemental turn signal apparatus in accordance with the present invention broadly includes at least one signal display and activatable connection structure. The vehicle utilizing the supplemental apparatus has a conventional turn signal system including at least one manually actuatable system switch, at least one signal lamp for visually indicating the intention to turn, and means for energizing the lamp. The connection structure is electrically coupled to the system switch and the signal display so that when the system switch is actuated, the connection structure may be activated, thereby energizing the lamp and the signal display synchronously.

In preferred forms where the vehicle incorporates a conventional turn signal lever, the connection structure includes a button device mounted on the turn signal lever so that the connection structure may be conveniently activated by hand. Additionally, maintenance circuitry may be incorporated into the connection structure so that after the connection structure is activated (for example, by manually depressing a button on the turn signal lever) the button may be released—yet the connection structure remains activated so long as the system switch is actuated. In particularly preferred forms, the supplemental turn signal apparatus further includes audible signal structure and dashboard flashers for audibly alerting other motorists of the intention to turn in the former instance, and giving visual feedback of activation of the connecting structure to the turning driver in the latter.

DESCRIPTION OF THE PREFERRED EMBODIMENT

Figure 2:
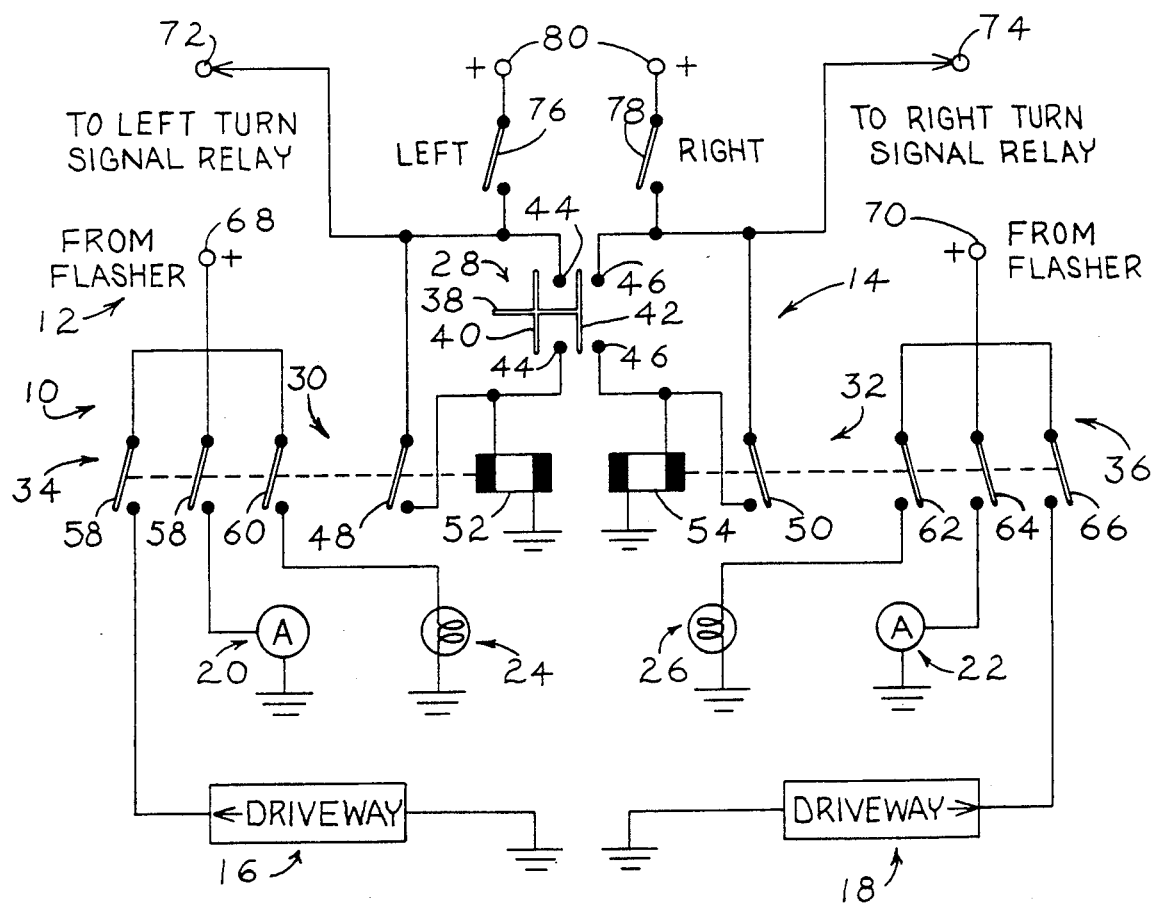
FIG. 2 is a schematic diagram portraying portions of the vehicle's turn signal system in juxtaposition with the supplemental turn signal apparatus.

Referring now to the drawing in general, and FIG. 2 in particular, a supplemental turn signal apparatus for vehicles (also referred to as a supplemental turn signal apparatus, or simply, apparatus) 10 is schematically depicted in the lower two thirds area of the figure, while elements of a conventional electrical turn signal system 12 are depicted in the upper one third portion. Apparatus 10 includes activable connection structure 14, signal displays 16, 18, audible signal devices 20, 22 and dashboard flasher devices 24, 26.

In more detail, connection structure 14 includes button device 28, maintenance devices 30, 32, relays 34, 36. Button device 28 provides suitable hardware for housing double pole single-throw (DPST) switch or structure 38 having contacts 40, 42. Contact terminals 44 and 46 are disposed adjacent DPST structure 38 which has a neutral position (as shown in FIG. 2) and an activable position wherein DPST structure 38 is shifted rightwardly so that contact 40 engages terminals 44 and contact 42 engages terminals 46. Button device 28 is biased to the neutral position. Any other component with similar open and closed positions and with a bias toward the open position may be suitably substituted for button device 28.

Maintenance device 30 includes left maintenance switch 48 while maintenance device 32 includes right maintenance switch 50. Similarly maintenance device 30 includes left coil 52 and maintenance device 32 includes right coil 54. Four pole double-throw relay 34 includes contacts or supplemental switches 56–60 and four pole double-throw relay 36 includes contacts or supplemental switches 62–66.

Turn signal system 12, as partially depicted in FIG. 2, includes flashers or signal lamps 68, 70, turn signal relays 72, 74, system switches 76, 78, and battery 80.

Figure 1:
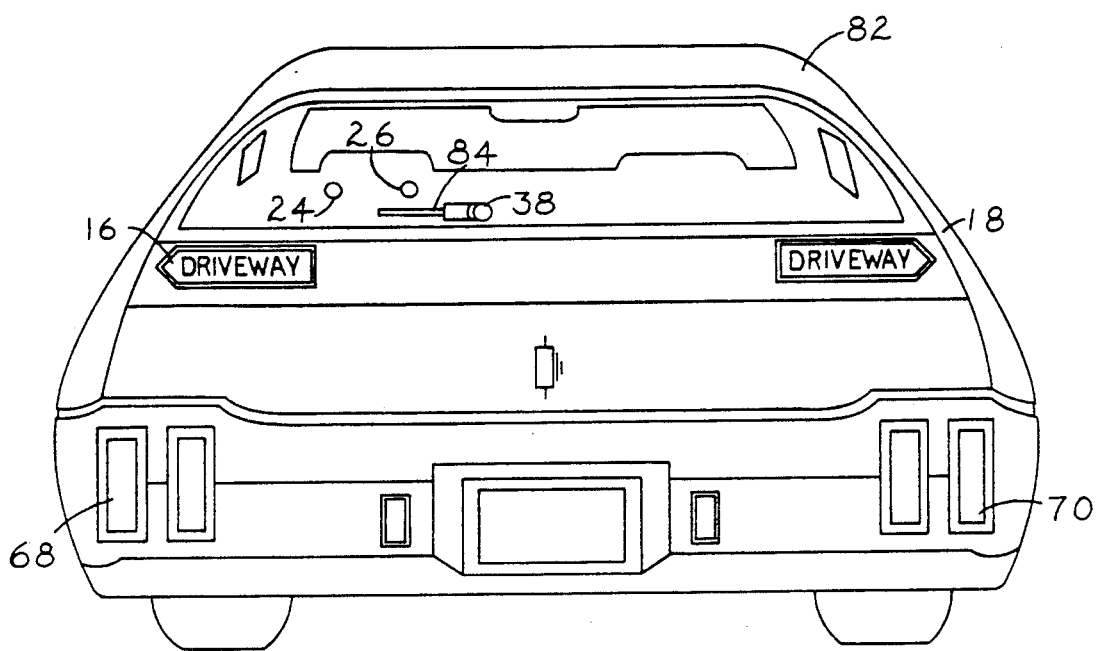
FIG. 1 is a rear view of a vehicle incorporating the supplemental turn signal apparatus in accordance with the present invention.

In operation, and referring now generally to FIGS. 1 and 2, when the driver of vehicle 82 elects to make an immediate left-hand turn into a driveway, he depresses a turn signal lever 84, normally attached to the steering column (not shown). The physical action of depressing the turn signal lever closes system switch 76 thereby sending current from battery 80 to left turn signal relay 72. In this condition the system switch 68 is said to be actuated (assuming system switch 76 is in contact with battery 80, of course). The DPST structure 38 is then manually depressed to the activatable position (in the preferred embodiment, button device 28 is housed on the end of the turn signal lever). In this fashion, left contact 40 engages terminals 44 so that current also flows from battery 80 to left coil 52. Current flowing in coil 52 induces the closing of supplemental switches 56-60 as well as maintenance switch 48.

The driver may then terminate the action of depressing DPST structure 38 since an alternate current route from battery 80 to coil 52 is now provided via maintenance switch 48 which is induced to remain in a closed position as long as system switch 76 remains closed, as will be readily appreciated by those skilled in the art. At this point, left signal display 16, left audible signal device 20 and left dashboard flasher device 24 receive intermittent signals from flasher 68 via supplemental switches 56-60 respectively. In this condition, connection structure 14 is said to be activated and will remain so as long as system switch 76 remains closed. Therefore, both flasher 68 and signal display 16 are energized, as are audible device 20 and dashboard flasher device 24, all in a synchronous fashion. Thus not only will flasher 68 blink conventionally, but also signal display 16 will visually indicate that a driveway turn is intended. Also, the driver will receive visual feedback that supplemental turn signal apparatus 10 is functioning due to the synchronous blinking action of dashboard flasher device 24. Following drivers will also receive an audible signal via audible signal device 20 which may be readily connected to a conventional automobile horn. Other methods of making audible signals will readily suggest themselves to those skilled in the art and such are within the spirit of this invention.

When the turn has been completed the turn signal lever will return to its midway position, thus opening system switch 76, thus deactivating the apparatus 10 as well as the turn signal system 12. Execution of a right hand turn is in all respects completely analogous to the above described process and hence will not be described for the sake of brevity. Methods of incorporating dashboard flasher devices 24 and 26 into the conventional turn signal flasher components will readily suggest themselves to those skilled in the art as will methods of installing other components associated with turn signal apparatus 10. In particular, as above stated, much of the circuitry, and hardware of button device 28 may be housed directly on the turn signal lever.

Of course, visual messages other than "driveway" may be adapted for use in the signal displays. Those skilled in the art will appreciate that LED components, as well as other devices may be used to construct an unlimited variety of color schemes, patterns and messages.

I claim:

1. A supplemental turn signal apparatus for a vehicle having an electrical turn signal system including at least one manually actuatable system switch shiftable between an open position and a closed position, at least one signal lamp and means for energizing the lamp, the supplemental apparatus comprising:

at least one signal display conspicuously mounted on the vehicle;

selectively activatable connection means for selectively electrically connecting the system switch to said signal display when the system switch is shifted to the closed position thereof, said connection means including structure for selectively coupling the system switch and signal display in order to simultaneously energize the signal lamp and said signal display, said coupling structure comprising button switch means for selectively electrically coupling the signal display with the system switch, said button switch means including moveable structure moveable between an activated position and a neutral position, said moveable structure being biased to the neutral position, said connection means including maintenance means operably connected to the system switch for maintaining current flow from said system switch to said signal display during the time when said system switch is in the closed position thereof and said button switch means is momentarily moved to said activated position and thereafter returns to the neutral position.

2. The supplemental turn signal apparatus of claim 1, wherein the vehicle's turn signal system includes a turn signal level operably coupled with the system switch, and said button switch means is mounted on the turn signal lever.

3. The supplemental turn signal apparatus of claim 1, wherein said connection means further includes at least one supplemental switch having a closed position and an open position separate from said button switch means and a signal device, said supplemental switch being operably coupled with said maintenance means for maintaining said supplemental switch in a closed position and thereby energizing said signal device after said moveable structure of said button switch means returns to the neutral position, so long as the system switch is in said closed position.

4. The supplemental turn signal apparatus of claim 3, wherein said maintenance means includes a coil operably coupled with said button switch means and said supplemental switch.

* * * * *